US011216132B2

(12) United States Patent
Wang et al.

(10) Patent No.: US 11,216,132 B2
(45) Date of Patent: Jan. 4, 2022

(54) TOUCH SUBSTRATE, TOUCH CONTROL DISPLAY APPARATUS, AND METHOD OF FABRICATING TOUCH SUBSTRATE

(71) Applicants: Hefei Xinsheng Optoelectronics Technology Co., Ltd., Anhui (CN); BOE Technology Group Co., Ltd., Beijing (CN)

(72) Inventors: Jing Wang, Beijing (CN); Tsungchieh Kuo, Beijing (CN); Dong Li, Beijing (CN); Min He, Beijing (CN); Xiaodong Xie, Beijing (CN); Lingyan Wu, Beijing (CN); Qin Zeng, Beijing (CN); Qidi Wu, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 267 days.

(21) Appl. No.: 16/494,940

(22) PCT Filed: Nov. 12, 2018

(86) PCT No.: PCT/CN2018/115028
§ 371 (c)(1),
(2) Date: Sep. 17, 2019

(87) PCT Pub. No.: WO2020/097755
PCT Pub. Date: May 22, 2020

(65) Prior Publication Data
US 2021/0333936 A1 Oct. 28, 2021

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0416* (2013.01);
(Continued)

(58) Field of Classification Search
CPC .. G06F 3/041–047; G06F 2203/04111–04112; G06F 3/0445
(Continued)

(56) References Cited

U.S. PATENT DOCUMENTS

2014/0253499 A1* 9/2014 Lee ..................... G06F 3/0448
345/174
2015/0185893 A1 7/2015 Wu et al.
(Continued)

FOREIGN PATENT DOCUMENTS

| CN | 101488066 A | 7/2009 |
| CN | 101694605 A | 4/2010 |

(Continued)

OTHER PUBLICATIONS

International Search Report & Written Opinion dated Jul. 26, 2019, regarding PCT/CN2018/115028.
(Continued)

*Primary Examiner* — Sanjiv D. Patel
(74) *Attorney, Agent, or Firm* — Intellectual Valley Law, P.C.

(57) ABSTRACT

A touch substrate includes a first touch electrode layer including a plurality of first touch electrodes; a second touch electrode layer including a plurality of second touch electrodes; and a plurality of first connecting structures. Each of the plurality of second touch electrodes includes a plurality of second touch electrode blocks electrically connected substantially along a first direction. Each of the plurality of first touch electrodes includes a plurality of first touch electrode blocks electrically connected substantially along a
(Continued)

second direction. Each individual one of the plurality of first connecting structures is between two adjacent first touch electrode blocks. The two adjacent first touch electrode blocks along the second direction are electrically connected to each other through one of the plurality of first connecting structures. Each of the plurality of first connecting structures includes a first conductive connecting ring.

18 Claims, 12 Drawing Sheets

(52) U.S. Cl.
CPC .. *G06F 3/0446* (2019.05); *G06F 2203/04102* (2013.01); *G06F 2203/04103* (2013.01); *G06F 2203/04111* (2013.01)

(58) Field of Classification Search
CPC .... G06F 3/04164; G06F 3/0412; G06F 3/044; G06F 3/0443; G06F 3/03547; G06F 3/04166–041662
See application file for complete search history.

(56) References Cited

U.S. PATENT DOCUMENTS

| | | | | |
|---|---|---|---|---|
| 2015/0277483 A1* | 10/2015 | Lee | ........................ | G06F 3/0446 345/174 |
| 2017/0277325 A1* | 9/2017 | Xie | ........................ | G06F 3/0412 |
| 2018/0181224 A1* | 6/2018 | Li | ........................ | G06F 3/0445 |
| 2019/0042035 A1* | 2/2019 | Kim | ........................ | G06F 3/0412 |
| 2019/0102002 A1* | 4/2019 | Lee | ........................ | G06F 3/0412 |
| 2019/0163306 A1 | 5/2019 | Wang et al. | | |

FOREIGN PATENT DOCUMENTS

| | | | |
|---|---|---|---|
| CN | 206470721 U | | 9/2017 |
| CN | 107957816 A | * | 4/2018 |
| JP | 2013003915 A | | 1/2013 |

OTHER PUBLICATIONS

First Office Action in the Chinese Patent Application No. 201880001990.7, dated Dec. 11, 2019; English translation attached.

* cited by examiner forming a first touch electrode layer including a plurality of first touch electrodes successively along a first direction, each of the plurality of first touch electrodes extending substantially along a second direction; wherein forming each of the plurality of first touch electrodes includes forming a plurality of first electrode blocks electrically connected substantially along the second direction

forming a second touch electrode layer including a plurality of second touch electrodes successively along the second direction, each of the plurality of second touch electrodes extending substantially along the first direction; wherein forming each of the plurality of second touch electrodes includes forming a plurality of second electrode blocks electrically connected substantially along the first direction

forming a plurality of first connecting structures, each individual one of which being formed between two adjacent first touch electrode blocks of a respective one of the plurality of first touch electrodes; the two adjacent first touch electrode blocks along the second direction of the respective one of the plurality of first touch electrodes are formed to be electrically connected to each other through one of the plurality of first connecting structures; forming each of the plurality of first connecting structures includes forming a first conductive connecting ring

FIG. 10

TOUCH SUBSTRATE, TOUCH CONTROL DISPLAY APPARATUS, AND METHOD OF FABRICATING TOUCH SUBSTRATE

CROSS-REFERENCE TO RELATED APPLICATION

This application is a national stage application under 35 U.S.C. § 371 of International Application No. PCT/CN2018/115028, filed Nov. 12, 2018, the contents of which are incorporated by reference in the entirety.

TECHNICAL FIELD

The preset disclosure relates to display technology, more particularly, to a touch substrate, a touch control display apparatus, and a method of fabricating a touch substrate.

BACKGROUND

In recent years, touch devices have been widely used many electronic devices such as mobile phones, computer display panels, touch screens, satellite navigation devices, digital cameras, etc. Examples of touch devices include a mutual-capacitance touch control device and a self-capacitance touch control device. In a mutual-capacitance touch control device, the touch electrodes include multiple touch scanning electrodes (Tx) and multiple touch sensing electrodes (Rx). In a self-capacitance touch control device, de touch electrode can achieve touch control function alone. When a finger touches a point on the touch control display panel, the capacitor of the finger superimposes on the touch panel capacitor, resulting in a change in the capacitance of the touch panel capacitor. Based on the capacitance change upon a touch event, the coordinates of the touch scanning electrode and the touch sensing electrode being touched may be determined. In detecting touch events, the mutual capacitive touch display panel examine the touch scanning electrode array and the touch sensing electrode array sequentially. Touch resolution correlates with the distance between adjacent conductive channels. A smaller distance between adjacent conductive channels results in a higher touch resolution.

SUMMARY

In one aspect, the present invention provides a touch substrate, comprising a first touch electrode layer comprising a plurality of first touch electrodes successively along a first direction, each of the plurality of first touch electrodes extending substantially along a second direction; and a second touch electrode layer comprising a plurality of second touch electrodes successively along the second direction, each of the plurality of second touch electrodes extending substantially along the first direction; wherein each of the plurality of first touch electrodes comprises a plurality of first touch electrode blocks electrically connected substantially along the second direction; and each of the plurality of second touch electrodes comprises a plurality of second touch electrode blocks electrically connected substantially along the first direction wherein the touch substrate further comprising a plurality of first connecting structures, each individual one of which being between two adjacent first touch electrode blocks of a respective one of the plurality of first touch electrodes; the two adjacent first touch electrode blocks along the second direction of the respective one of the plurality of first touch electrodes are electrically connected to each other though one of the plurality of first connecting structures; and each of the plurality of first connecting structures comprises a first conductive connecting ring.

Optionally, at least one of the plurality of first connecting structures further comprises a first conductive connecting island surrounded by the first conductive connecting ring.

Optionally, the at least one of the plurality of first connecting structures further comprises one or more first island bridges connecting the first conductive connecting island to the first conductive connecting ng.

Optionally, each of the one or more first island bridges extends along a direction that is non-parallel to the first direction and non-parallel to the second direction.

Optionally, the plurality of first touch electrodes and the plurality of second touch electrodes cross over each other thereby forming a plurality of intersections; each of the plurality of first connecting structures is between a first intersection and a second intersection of the plurality of intersections; and the first intersection and the second intersection are along the second direction and adjacent to each other.

Optionally, the touch substrate further comprises a first bridge and a second bridge insulated from each other and at the first intersection of the plurality of intersections; and a third bridge and a fourth bridge insulated from each other and at the second intersection of the plurality of intersections; wherein the second bridge connects two adjacent second touch electrode blocks of a first one of the plurality of second touch electrodes at the first intersection and along the first direction; the fourth bridge connects two adjacent second touch electrode blocks of a second one of the plurality of second touch electrodes at the second intersection and along the first direction; and each of the plurality of first connecting structures is connected to two adjacent first touch electrode blocks of a respective one of the plurality of first touch electrodes along the second direction, respectively through the first bridge at the first intersection and the third bridge at the second intersection.

Optionally, the two adjacent first touch electrode blocks of the respective one of the plurality of first touch electrodes, the first bridge at the first intersection, and the third bridge at the second intersection, constitute an integral structure, are in a same layer, and comprise a same material.

Optionally, the plurality of first touch electrodes, the plurality of second touch electrodes, the plurality of first connecting structures, the first bridge, and the third bridge we in a same layer, and comprise a same material; the touch substrate further comprises an insulating layer insulating the first bridge from the second bridge and insulating the third bridge from the fourth bridge; and the second bridge and the fourth bridge are on a side of the insulating layer distal to the same layer comprising the plurality of first touch electrodes, the plurality of second touch electrodes, the plurality of first connecting structures, the first bridge, and the third bridge.

Optionally, at least one of the plurality of first connecting structures further comprises a first conductive connecting island surrounded by the first conductive connecting ring, and one or more first island bridges connecting the first conductive connecting island to the first conductive connecting ring; the one or more first island bridges are on a side of the insulating layer distal to the first conductive connecting ring and the first conductive connecting island; and the insulating layer space apart the first conductive connecting ring from the first conductive connecting island.

Optionally the touch substrate further comprises a plurality of dummy patterns; wherein two adjacent first connecting structures of the plurality of first connecting structures along the first direction are spaced apart by one of the plurality of dummy patterns, which also spaces apart two adjacent second touch electrode blocks respectively from two adjacent second touch electrodes of the plurality of second touch electrodes.

Optionally, the plurality of first touch electrodes, the plurality of second touch electrodes, the plurality of first connecting structures, the first bridge, the second bridge, the third bridge, and the fourth bridge are made of a same metal oxide material.

Optionally, multiple ones of the plurality of first touch electrode blocks of a respective one of the plurality of first touch electrodes and multiple ones of the plurality of first connecting structures are alternately arranged along the second direction, thereby faming a conductive channel of the respective ace of the plurality of the first touch electrodes.

Optionally, the touch substrate further comprises a plurality of second connecting structures each individual one of which being between two adjacent second touch electrode blocks of a respective one of the plurality of second touch electrodes; wherein the two adjacent second touch electrode blocks along the second direction of the respective one of the plurality of second touch electrodes are electrically connected to each other through one of the plurality of second connecting structures; and each of the plurality of second connecting structures comprises a second conductive connecting ring.

Optionally, at least one of the plurality of second connecting structures further comprises a second conductive connecting island surrounded by the second conductive connecting ring.

Optionally, the at least one of the plurality of second connecting structures further comprises one or more second island bridges connecting the second conductive connecting island to the second conductive connecting ring.

Optionally, the touch substrate further comprises a plurality of first touch signal lines and a plurality of second touch signal lines; wherein each of the plurality of first touch signal lines is electrically connected to two or more of the plurality of first touch electrodes, which are electrically connected in parallel; and each of the plurality of second touch signal lines is electrically connected to two or more of the plurality of second touch electrodes, which are electrically connected in parallel.

In another aspect, the present invention provides a touch control display apparatus comprising the touch substrate described herein or fabricated by a method described herein.

Optionally, the touch control display apparatus is a flexible touch control display apparatus.

Optionally, the touch control display apparatus has a plurality of subpixels; and each of the plurality of subpixels comprises four of the plurality of first connecting structures.

In another aspect, the present invention provides a method of fabricating a touch substrate, comprising forming a first touch electrode layer comprising a plurality of first touch electrodes successively along a first direction, each of the plurality of first touch electrodes extending substantially along a second direction; and forming a second touch electrode layer comprising a plurality of second touch electrodes successively along the second direction, each of the plurality of second touch electrodes tending substantially along the first direction; wherein forming each of the plurality of first touch electrodes comprises forming a plurality of first touch electrode blocks electrically connected substantially along the second direction; and forming each of the plurality of second touch electrodes comprises forming a plurality of second touch electrode blocks electrically connected substantially along the first direction; wherein the method further comprising forming a plurality of first connecting structures, each individual one of which being formed between two adjacent first touch electrode blocks of a respective one of the plurality of first touch electrodes; the two adjacent first touch electrode blocks along the second direction of the respective one of the plurality of first touch electrodes are formed to be electrically connected to each other through one of the plurality of first connecting structures; and forming each of the plurality of first connecting structures comprises forming a first conductive connecting ring.

BRIEF DESCRIPTION OF THE FIGURES

The following drawings are merely examples for illustrative purposes according to various disclosed embodiments and are not intended to limit the scope of the present disclosure.

FIG. 10 is a flow chart rating a method of fabricating a touch substrate in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Flexible bendable, and rollable electronic apparatuses, including those of display apparatuses, have been developed in recent years. The display apparatuses are developed to be capable of to be bent uni-directionally initially. Recently, display apparatuses capable of being bent in my direction, or bent into a three-dimensional shape, have also been developed. Because the touch electrodes are typically made of brittle materials such as metal oxides. The touch electrodes are prone to stress-induced damages in these display apparatuses.

Accordingly, the present disclosure provides, inter alia, a touch substrate, a touch control display apparatus, and a method of fabricating a touch substrate that substantially obviate one or more of the problems de to limitations and disadvantages of the related art. In one aspect, the present disclosure provides a touch substrate. In some embodiment, the touch substrate includes a first touch electrode layer and a second touch electrode layer. The first touch electrode layer includes a plurality of first touch electrodes successively along a first direction. Each of the plurality of first touch electrodes extends substantially along a second direction. The second touch electrode layer includes a plurality of second touch electrodes successively along the second direction. Each of the plurality of second such electrodes extending substantially along the first direction. Each of the plurality of first touch electrodes includes a plurality of first touch electrode blocks electrically connected substantially along the second direction. Each of the plurality of second touch electrodes includes a plurality of second touch electrode blocks electrically connected substantially along the first direction. Optionally, the touch substrate further includes a plurality of first connecting structures. Each individual one of the plurality of first connecting structures is between two adjacent first touch electrode blocks of a respective one of the plurality of first touch electrodes. The two adjacent first touch electrode blocks along the second direction of the respective one of the plurality of first touch electrodes are electrically connected to each other tough one of the plurality of first connecting structures. Each of the plurality of first connecting structures comprises a first conductive connecting ring.

Figure 1:
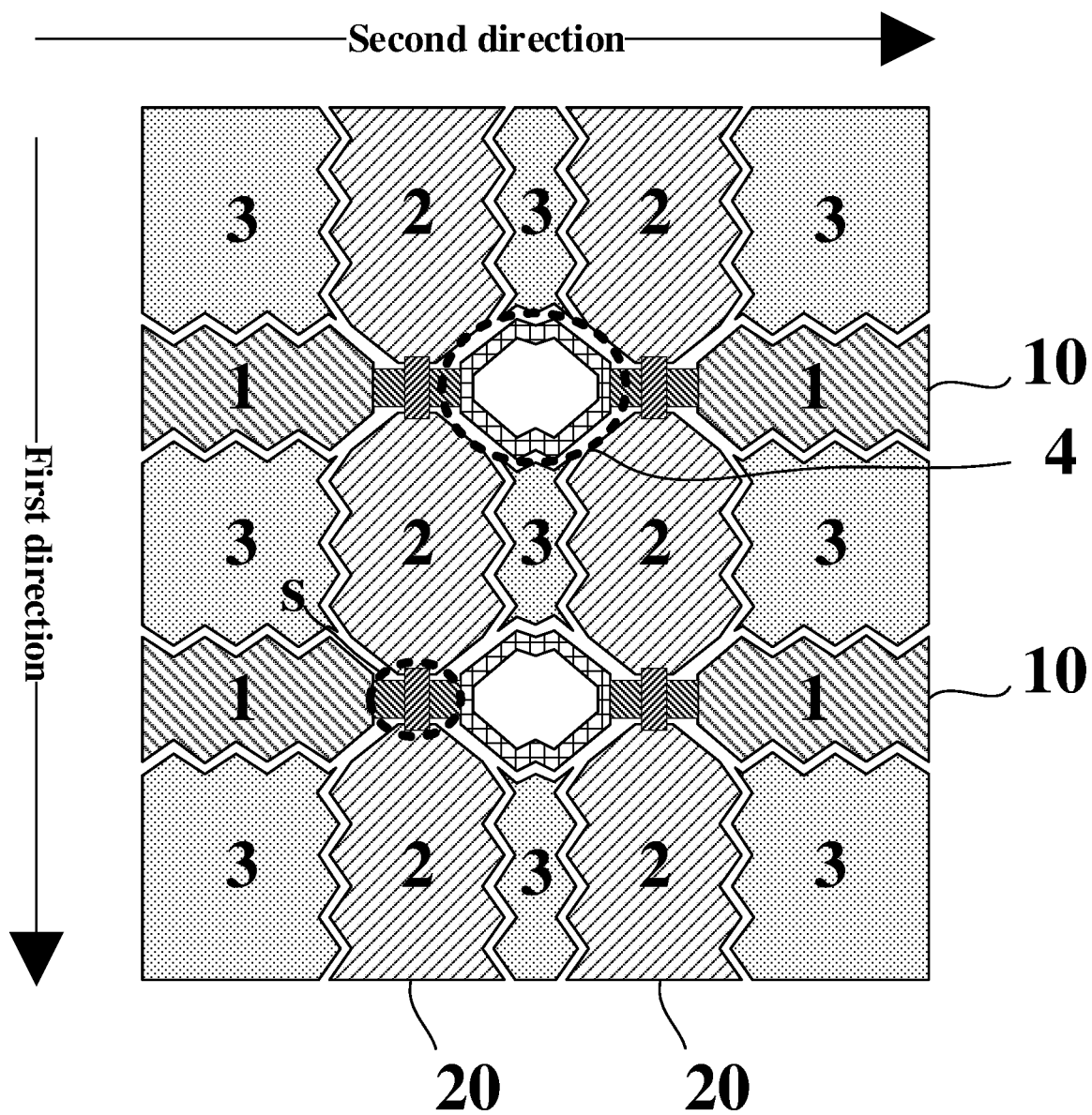
FIG. 1 is a schematic diagram illustrating the structure of a touch substrate in some embodiments according to the present disclosure.

FIG. 1 is a schematic diagram illustrating the structure of a touch substrate in same embodiments according to the present disclosure. Referring to FIG. 1, the touch substrate in some embodiments includes a first touch electrode layer and a second touch electrode layer. The first touch electrode layer includes a plurality of first touch electrodes 10 successively along a first direction. Each of the plurality of first touch electrodes 10 extends substantially along a second direction. Each of the plurality of first touch electrodes 10 includes a plurality of first touch electrode blocks 1 electrically connected substantially along the second direction. The second touch electrode layer includes a plurality of second touch electrodes 20 successively along the second direction. Each of the plurality of second touch electrodes 20 extends substantially along the first direction. Each of the plurality of second touch electrodes 20 includes a plurality of second touch electrode blocks 2 electrically connected substantially along the first direction.

Optionally, the touch substrate further includes a plurality of dummy patterns 3. As used herein, the term "dummy pattern" refers to a pattern that is not employed for passing a touch signal. Optionally, a dummy pattern is floating. Optionally, a dummy pattern is provided between adjacent touch electrode blocks. The dummy pattern is used to fill the gap between patterns of adjacent touch electrode blocks. The dummy pattern may be formed so as to prevent the region(s) where adjacent touch electrode blocks and the gap therebetween from being differently recognized. Optionally, the dummy pattern is in a floating state in which the dummy pattern is not connected to any of the touch electrode blocks.

Referring to FIG. 1, each of the plurality of first touch electrode blocks 1 has a first zigzag boundary having a plurality of rising edges and a plurality of falling edges. Optionally, substantially all edges of the first zigzag boundary are non-parallel to the first direction and we non-parallel to the second direction. Each of the plurality of second touch electrode blocks 2 has a second zigzag boundary having a plurality of rising edges and a plurality of falling edges. Optionally, substantially all edges of the second zigzag boundary are non-parallel to the first direction and are non-parallel to the second direction. Each of the plurality of dunny pattern 3 has a third zigzag boundary having a plurality of rising edges and a plurality of filing edges. Optionally, substantially all edges of the third zigzag boundary are non-parallel to the first direction and are non-parallel to the second direction. As used herein, the term "substantially all edges" means at least 80%, at least 85%, at least 90%, at least 95%, at least 96%, at least 97%, at least 98%, at least 99%, at least 99.5%, or at least 99.9% of edges.

In some embodiments, the touch substrate further includes a plurality of first connecting structures 4. Each individual one of the plurality of first connecting structures 4 is between two adjacent first touch electrode blocks of a respective one of the plurality of first touch electrodes 10, the two adjacent first touch electrode blocks of the respective one of the plurality of first touch electrodes 10 arranged along the second direction. The two adjacent first touch electrode blocks along the second direction of the respective one of the plurality of first touch electrodes 10 are spaced apart from each other, and are electrically connected to each other through one of the plurality of first connecting structures 4.

Figure 2A:
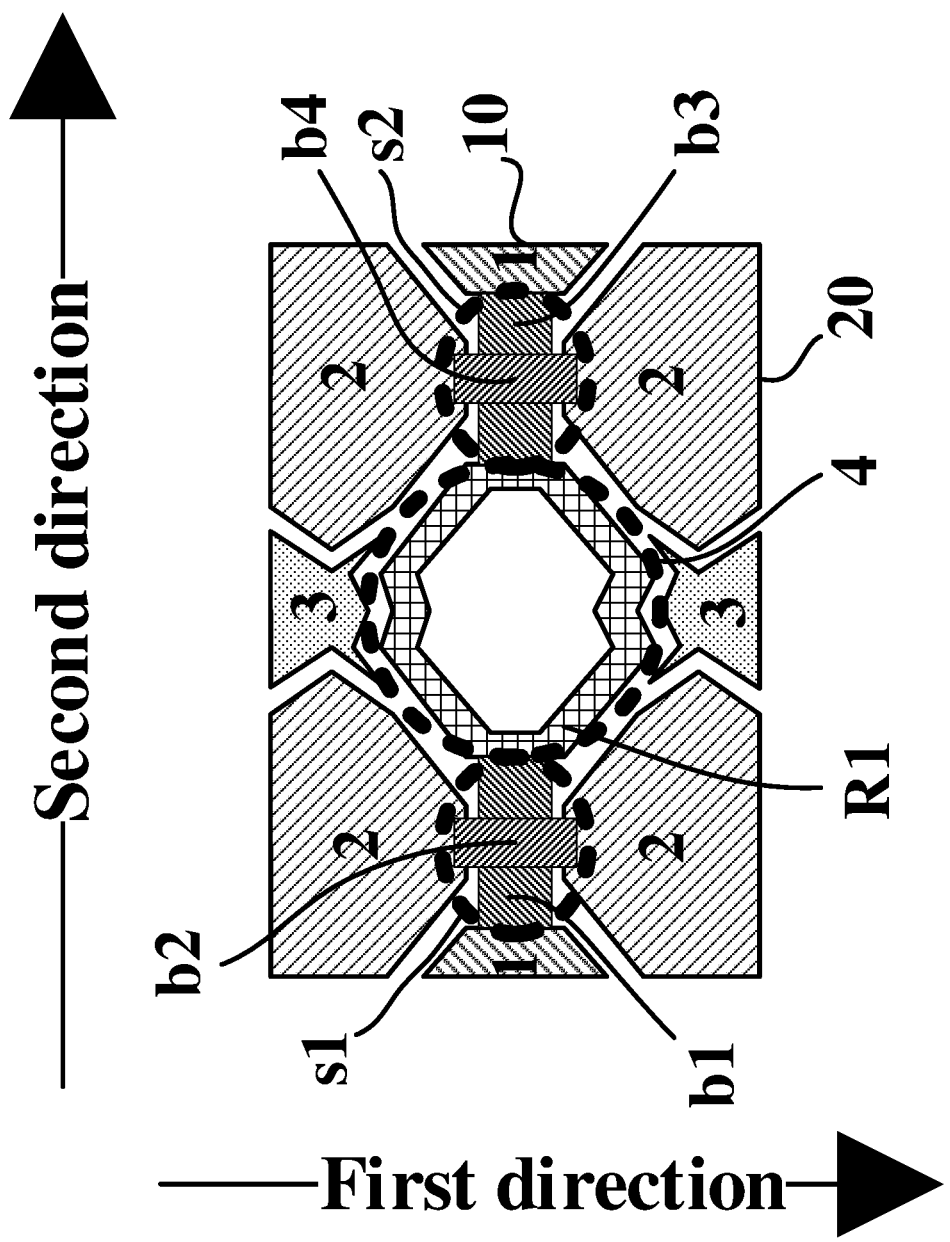
FIG. 2A is a schematic diagram illustrating the structure of a first connecting structure in some embodiments according to the present disclosure.

FIG. 2A is a schematic diagram illustrating the structure of a first connecting structure in some embodiments according to the present disclosure. Referring to FIG. 2A, each of the plurality of first connecting structures 4 includes a first conductive connecting ring R1. The two adjacent first touch electrode blocks along the second direction of the respective one of the plurality of first touch electrodes 10 are electrically connected to each other through one of the first conductive connecting ring R1.

Referring to FIG. 1 and FIG. 2A, the first connective connecting ring R1 has a fourth zigzag boundary having a plurality of rising edges and a plurality of falling edges. Optionally, substantially all edges of the fourth zigzag boundary are non-parallel to the first direction and are non-parallel to the second direction.

Referring to FIG. 1, the plurality of first touch electrodes 10 and the plurality of second touch electrodes 20 cross over each other, forming a plurality of intersections s. Refuting to FIG. 1 and FIG. 2A, the plurality of intersections s includes a first intersection s1 and a second intersection s2. The first intersection s1 and the second intersection s2 are along the second direction and adjacent to each other. Each of the plurality of first connecting structures 4 is between the first intersection s1 and the second intersection s2 of the plurality of intersections a.

As shown in FIG. 2A, the touch substrate further includes a first bridge b1 and a second bridge b2 insulated from each other and at the first intersection s1 of the plurality of intersections, and a third bridge b3 and a forth bridge b4 insulated from each other and at the second intersection s2 of the plurality of intersections. The second bridge 62 connects two adjacent second touch electrode blocks of a first one of the plurality of second touch electrodes 20 at the first intersection s1 and along the first direction. The fourth bridge b4 connects two adjacent second touch electrode blocks of a second one of the plurality of second touch electrodes 20 at the second intersection s2 and along the first direction. Each of the plurality of first connecting structures 4 is connected to two adjacent first touch electrode blocks of a respective one of the plurality of first touch electrodes 10 along the second direction, respectively through the first bridge b1 at the first intersection s1 and the third bridge 3 at the second intersection s2. Referring to FIG. 2A, the first conductive connecting ring R1 of a respective one of the plurality of first connecting structure is connected to a first adjacent first touch electrode block to the left side through the first bridge 61 at the first intersection s1, and is connected to a second adjacent first touch electrode block to the right side through the third bridge b3 at the second intersection s2.

Figure 2B:
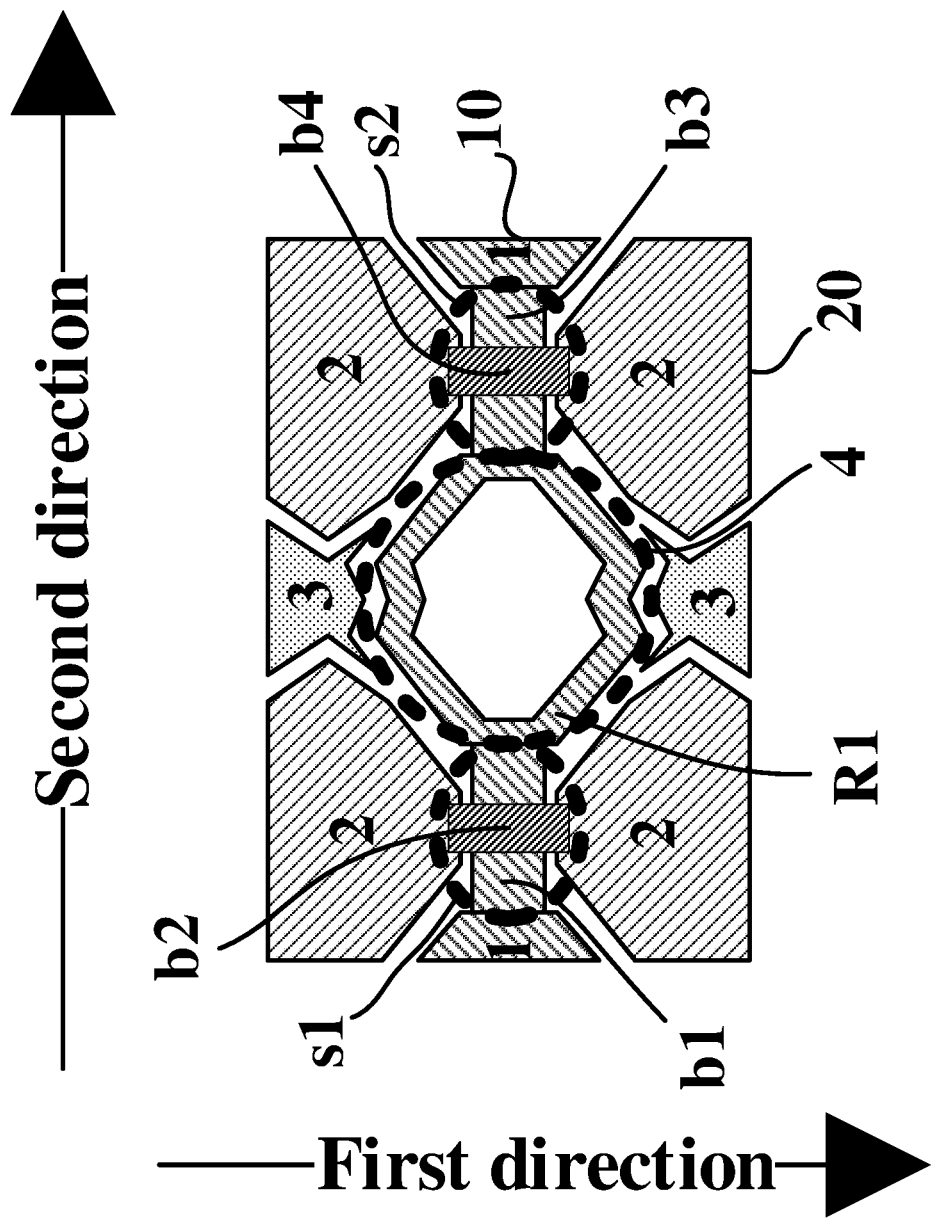
FIG. 2B is a schematic diagram illustrating the structure of a first connecting structure in some embodiments according to the preset disclosure.

FIG. 2B is a schematic diagram illustrating the structure of a first connecting structure in some embodiments according to the present disclosure. Referring to FIG. 2B, the two adjacent first touch electrode blocks of the respective one of the plurality of first touch electrodes 10, the first bridge b1 at the first intersection s1, and the third bridge b3 at the second intersection s2, constitute an integral structure, are in a same layer, and comprise a same material. Optionally, the two adjacent first touch electrode blocks of the respective one of the plurality of first touch electrodes 10, the first bridge b1 at the first intersection s1, the third bridge b3 at the second intersection s2, and the first conductive connecting ring R1 between the first intersection s1 and the second intersection s2, constitute an integral structure, are in a same layer, and comprise a same material.

Figure 3:
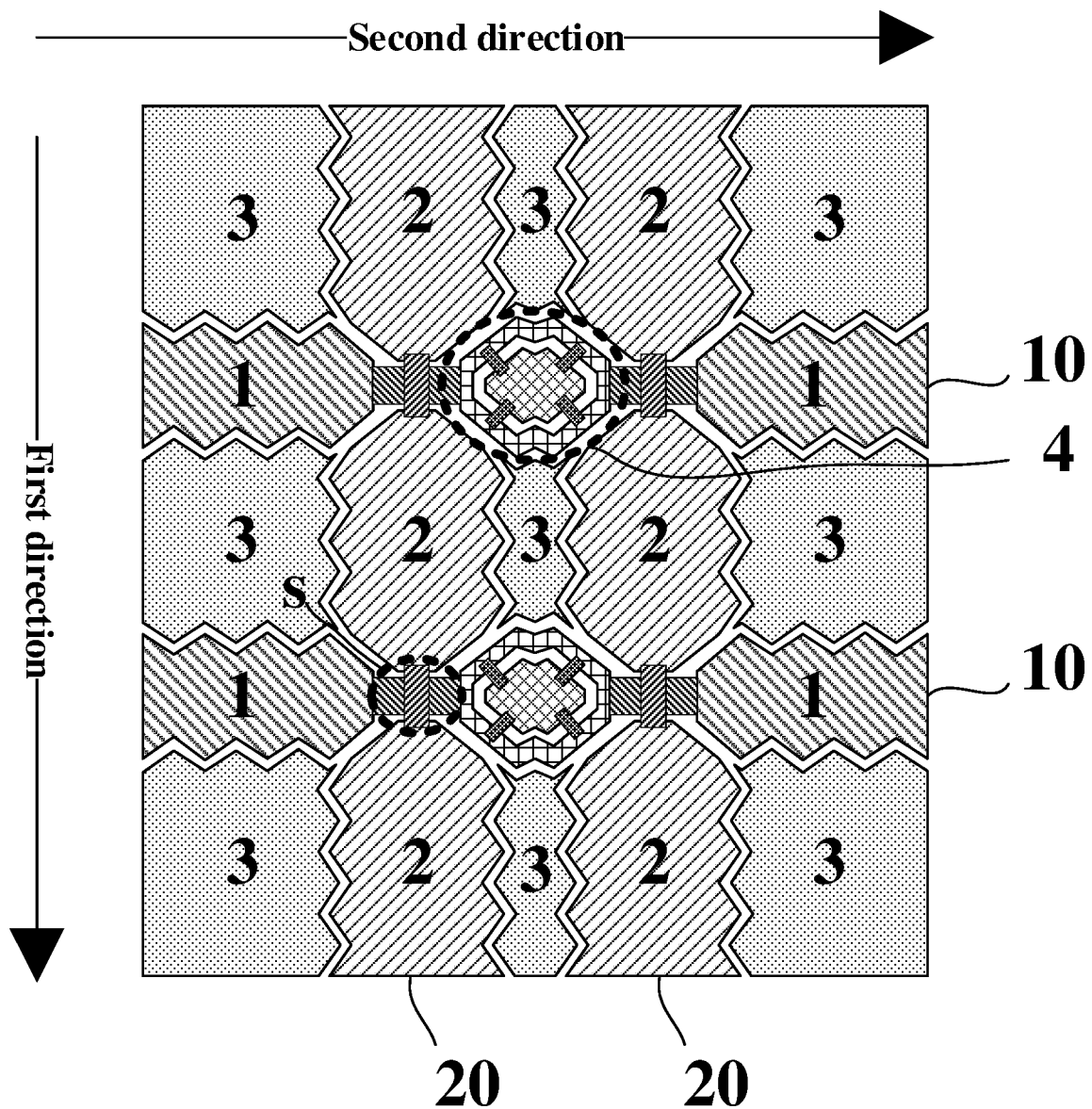
FIG. 3 is a schematic diagram illustrating the structure of a touch substrate in some embodiments according to the present disclosure.
Figure 4A:
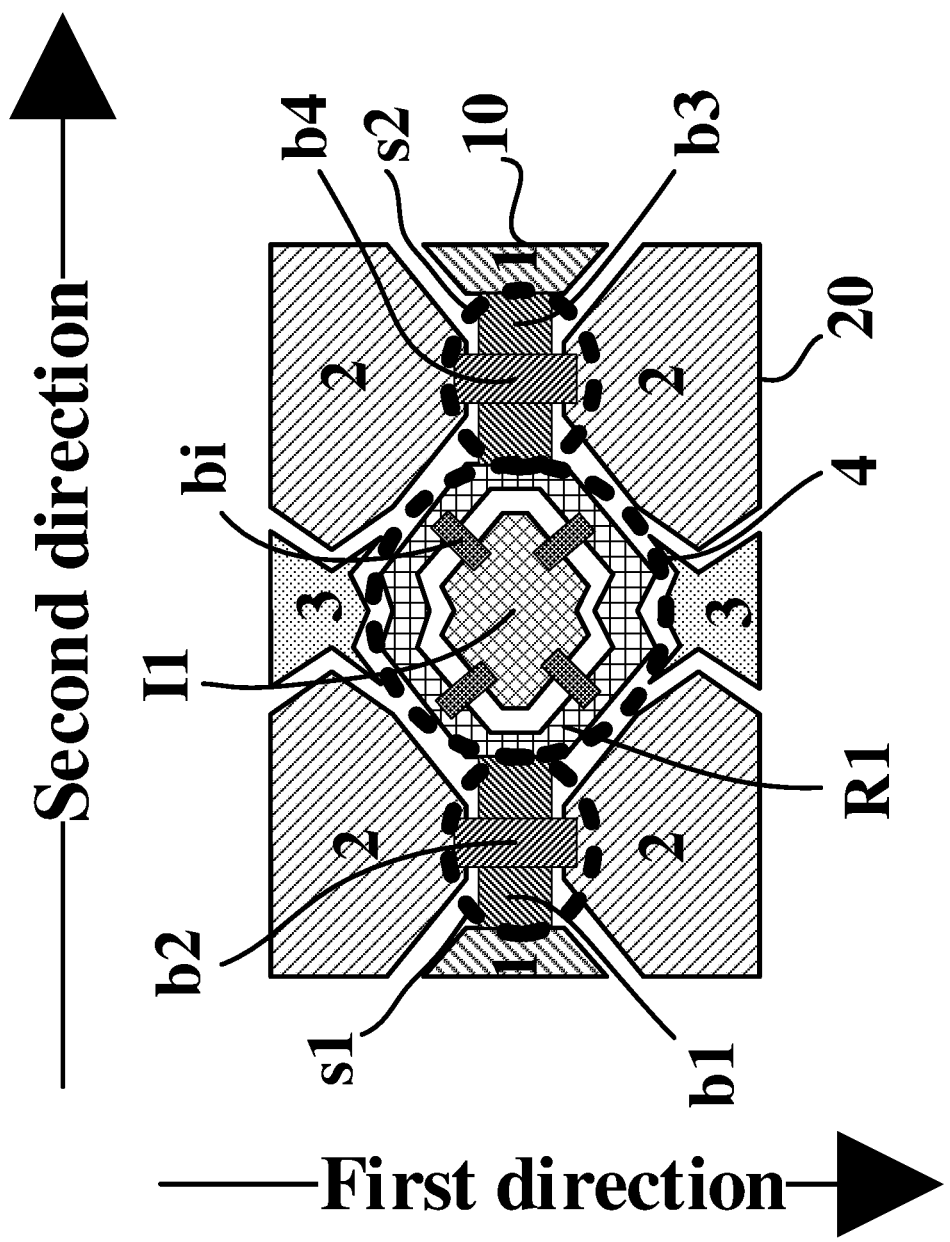
FIG. 4A is a schematic diagram illustrating the structure of a first connecting structure in some embodiments according to the present disclosure.

FIG. 3 is a schematic diagram illustrating the structure of a touch substrate in some embodiments according to the present disclosure. FIG. 4A is a schematic diagram illustrating the structure of a first connecting structure in some embodiments according to the present disclosure. Referring to FIG. 3 and FIG. 4A, in some embodiments, at least one of the plurality of first connecting structures 4 further includes a first conductive connecting island I1 surrounded by the first conductive connecting ring R1. The first conductive connecting island I1 is spaced apart from the first conductive connecting ring R1 by an insulating layer. Optionally, and referring to FIG. 4A, the at least on of the plurality of first connecting structures 4 further includes one or more first island bridges bi connecting the first conductive connecting island I1 to the first conductive connecting ring R1. Optionally, the at least one of the plurality of first connecting structures 4 further includes more than one of the one or more first island bridges bi. For example, FIG. 4A shows one of the plurality of first connecting structures 4 having four of the one or more first island bridges bi connecting the first conductive connecting island I1 to the first conductive connecting ring R1. Optionally, each of the plurality of first connecting structures 4 includes multiple ones of the one or more first island bridges bi connecting the first conductive connecting island I1 to the first conductive connecting ring R1. Optionally, each of the one or more first island bridges bi extends along a direction that is non-parallel to the first direction and non-parallel to the second direction.

As shown in FIG. 4A, each of the plurality of first connecting structures 4 is connected to two adjacent first touch electrode blocks of a respective one of the plurality of first touch electrodes 10 along the second direction, respectively through the first bridge b1 at the first intersection a1 and the third bridge b3 at the second intersection s2. The first conductive connecting ng R1 of a respective one of the plurality of first connecting structure 4 is connected to a first adjacent first touch electrode block to the left side through the first bridge b1 at the first intersection s1, and is connected to a second adjacent first touch electrode block to the right side through the third bridge b3 at the second intersection s2. The first conductive connecting ring R1 of a respective one of the plurality of first connecting structure is connected to the first conductive connecting island I1 of the respective one of the plurality of first connecting structure 4 though the one or more first island bridges bi.

Figure 4B:
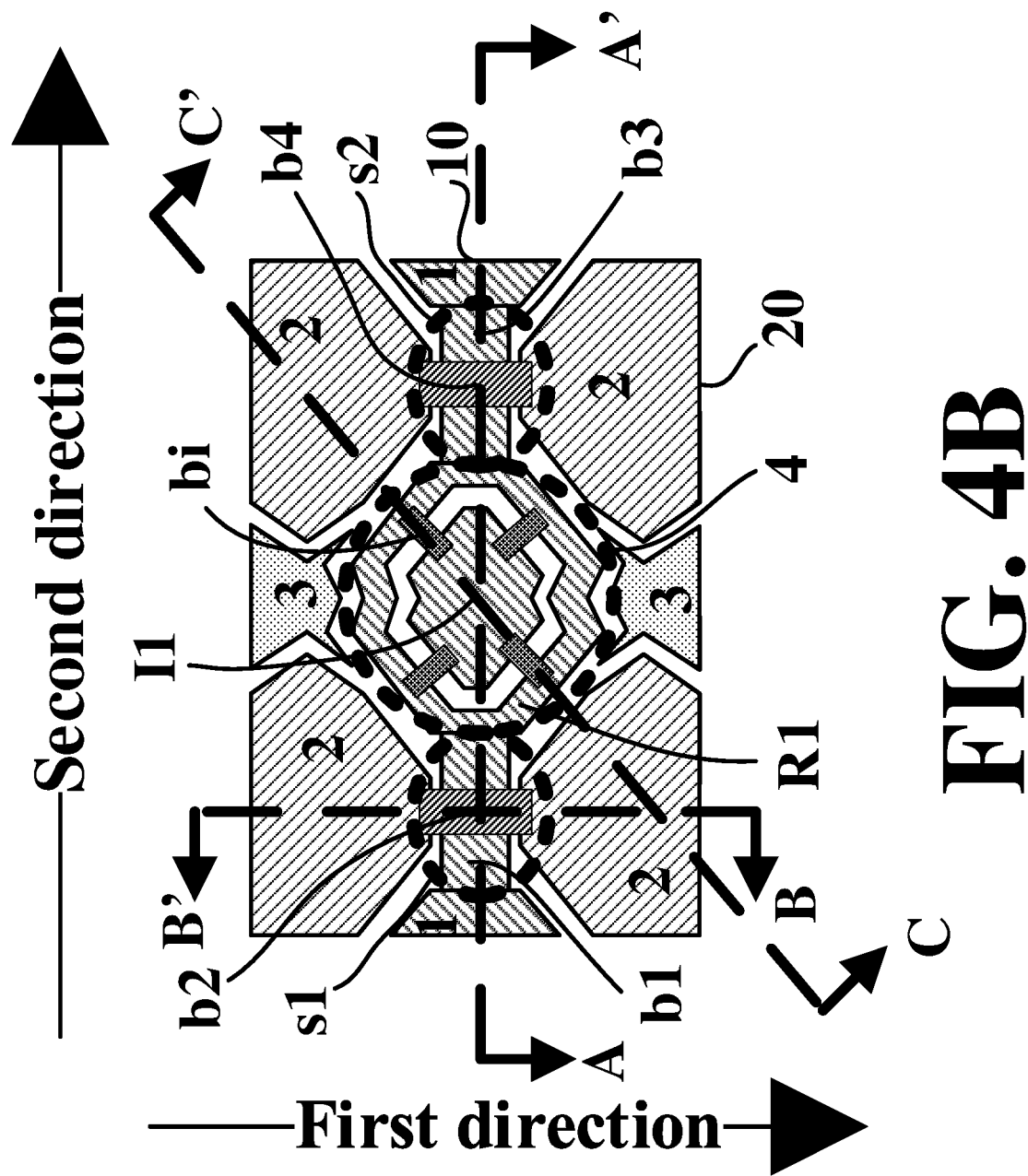
FIG. 4B is a schematic diagram illustrating the structure of a first connecting structure in some embodiments according to the present disclosure.

FIG. 4B is a schematic diagram illustrating the structure of a first connecting structure in some embodiments according to the present disclosure. Referring to FIG. 4B, the two adjacent first touch electrode blocks of the respective one of the plurality of first touch electrodes 10, the first bridge b1 at the first intersection s1, the third bridge b3 at the second intersection s2, and the first conductive connecting ring R1 between the first intersection s1 and the second intersection s2, constitute an integral structure, are in a same layer, and include a same material. Optionally, the first conductive connecting island I1 is also formed in a same layer and using a same material as the integral structure. The first conductive connecting island I1 is connected to the first conductive connecting ring R1 of the integral structure though the one or more first island bridges bi, which may be formed in a different layer.

Figure 5A:
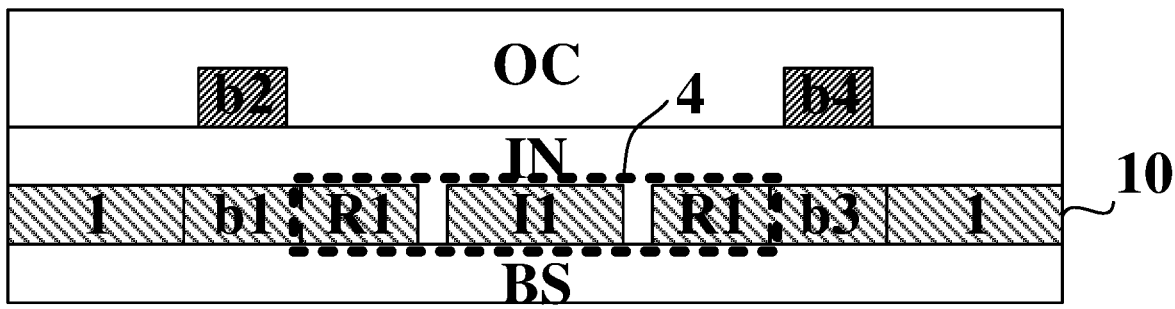
FIG. 5A is a cross-sectional view along A-A' line in FIG. 4B.
Figure 5B:
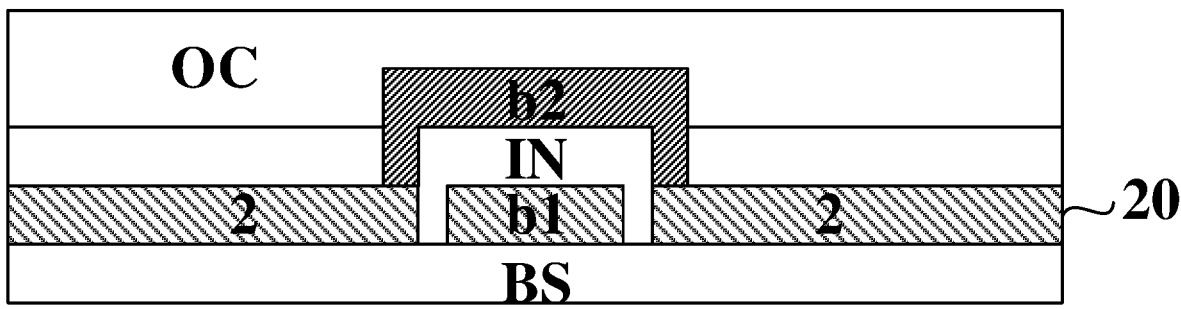
FIG. 5B is a cross-sectional view along B-B' line in FIG. 4B.
Figure 5C:
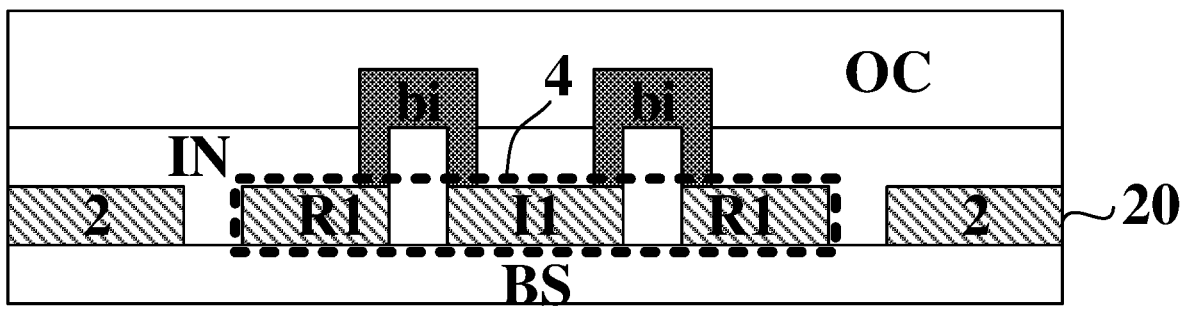
FIG. 5C is a cross-sectional view along C-C' line in FIG. 4B.

FIG. 5A is a cross-sectional view along A-A' line in FIG. 4B. IG. 5B is a cross-sectional view along B-B' line in FIG. 4B FIG. 5C is a cross-sectional view along C-C' line in FIG. 4B. Referring to FIG. 5A, FIG. 5B, and FIG. 5C, in some embodiments, the plurality of first touch electrodes 10, the plurality of second touch electrodes 20, the plurality of first connecting structures 4, the first bridge b1, and the third bridge b3 are in a same layer, and are made of a same material, e.g., in a same patterning process using a same mask plate. As used herein, the term "same layer" refers to the relationship between the layers simultaneously formed in the same step. In one example, the plurality of first touch electrodes 10 and the plurality of second touch electrodes 20 are in a same layer when they are formed as a result of one or more steps of a same patterning process performed in a same layer of material. In another example, the plurality of first touch electrodes 10 and the plurality of second touch electrodes 20 can be formed in a same layer by simultaneously performing the step of forming the plurality of first touch electrodes 10 and the step of forming the plurality of second touch electrodes 20. The term "same layer" does not always mean that the thickness of the layer or the height of the layer in a cross-sectional view is the same.

Referring to FIG. 5A and FIG. 5B, the touch substrate in some embodiments further includes an insulating layer IN insulating the first bridge b1 from the second bridge b2 and insulating the third bridge 63 from the fourth bridge 64. The insulating layer IN spaces apart the first conductive connecting ring R1 from the first conductive connecting island I1.

Referring to FIG. 5B, the second bridge b2 is electrically connected to the two adjacent second touch electrode blocks of a respective am of the plurality of second touch electrodes 20, through vias extending through the insulating layer IN. The insulating layer IN spaces apart the first bridge b1 from the two adjacent second touch electrode blocks of the respective one of the plurality of second touch electrodes 20.

Referring to FIG. 5C the one or more first island bridges bi are on a side of the insulating layer IN distal to the first conductive connecting ring R1 and the first conductive connecting island I1. The one or more first island bridges bit are electrically connected to the first conductive connecting island I1 and the first conductive connecting ring R1, through vias extending though the insulating layer IN. The insulating layer IN spaces apart the first conductive connecting ring R1 from the first conductive connecting island I1. The insulating layer IN spaces apart the first conductive connecting ring R1 from plurality of second touch electrodes 20.

Referring to FIG. 5A. FIG. 5B, and FIG. 5C, the insulating layer IN spaces two layers apart from each other, the first layer includes the plurality of first touch electrodes 10, the plurality of second touch electrodes 20, the plurality of first connecting structures 4, the first bridge b1, and the third bridge b3; and the second layer includes the second bridge b2, the fourth bridge b4, and the one or more first island bridges bi. The second bridge b2 and the fourth bridge b4 are on a side of the insulating layer IN distal to the first layer having the plurality of first touch electrodes 10, the plurality of second touch electrodes 20, the plurality of first connecting structures 4, the first bridge b1, and the third bridge b3.

Referring to FIG. 5A, FIG. 5B, and FIG. 5C, the touch substrate in some embodiments further includes an overcoat layer OC on a side of the second bridge b2, the fourth bridge 64, and the one or more island bridges bi distal to the insulating layer IN. The overcoat layer OC forms a flat surface an the touch substrate.

Referring to FIG. 5A, FIG. 5B, and FIG. 5C, the touch substrate in some embodiments further includes a base substrate BS on which the plurality of first touch electrodes 10 and the plurality of second touch electrodes 20 are disposed.

In some embodiments, the touch substrate is a touch substrate in a flexible electronic apparatus. For example, the flexible electronic apparatus can be folded or rolled to a desired shape. By having a plurality of first connecting structures 4 in the touch substrate, the touch electrode layers can be made extremely flexible. The plurality of first connecting structures 4 render the touch substrate into a highly fragmented pattern, greatly facilitating dissipation of stress induced by folding or bending of the flexible electronic apparatus. Each of the plurality of first connecting structures 4 has a highly branched structure, including multiple bridges (e.g., multiple ones of the one or more first island bridges bi) and multiple channels (e.g., the two channels formed by the first conductive connecting ring R1 and the four channels formed by the four of the one or more first island bridges bi). During bending or folding of the flexible electronic apparatus, if any individual one of these channels is damaged, the touch signal can still be conducted through other channel. Because the touch substrate has a highly branched structure, the flexible electronic apparats can be folded or bet along any direction. Optionally, the conductive channels in the present touch substrate can be further connected in parallel through signal lines, effectively reducing resistance of the touch conductive channels. Moreover, the touch substrate can be designed so that each subpixel of the flexible electronic apparatus includes four conductive channels passing through, greatly enhancing the touch sensitivity. Each subpixel includes multiple bridges along either the horizontal direction or the vertical direction, and includes multiple conductive channels along either the horizontal direction or the vertical direction. Any one bridge or any one conductive channel becomes damaged, the touch signal can still be effectively conducted through the remaining bridges and channels. Further, the bridges are distributed evenly throughout the subpixel, and do not cluster at limited numbers of positions, the blanking effect of the touch substrate can be significantly improved. The present touch substrate can be designed to have a pattern that supports various appropriate pitches. Optionally, the pattern of the touch substrate has a pitch in a range of approximately 3 mm to approximately 10 mm.

Figure 6:
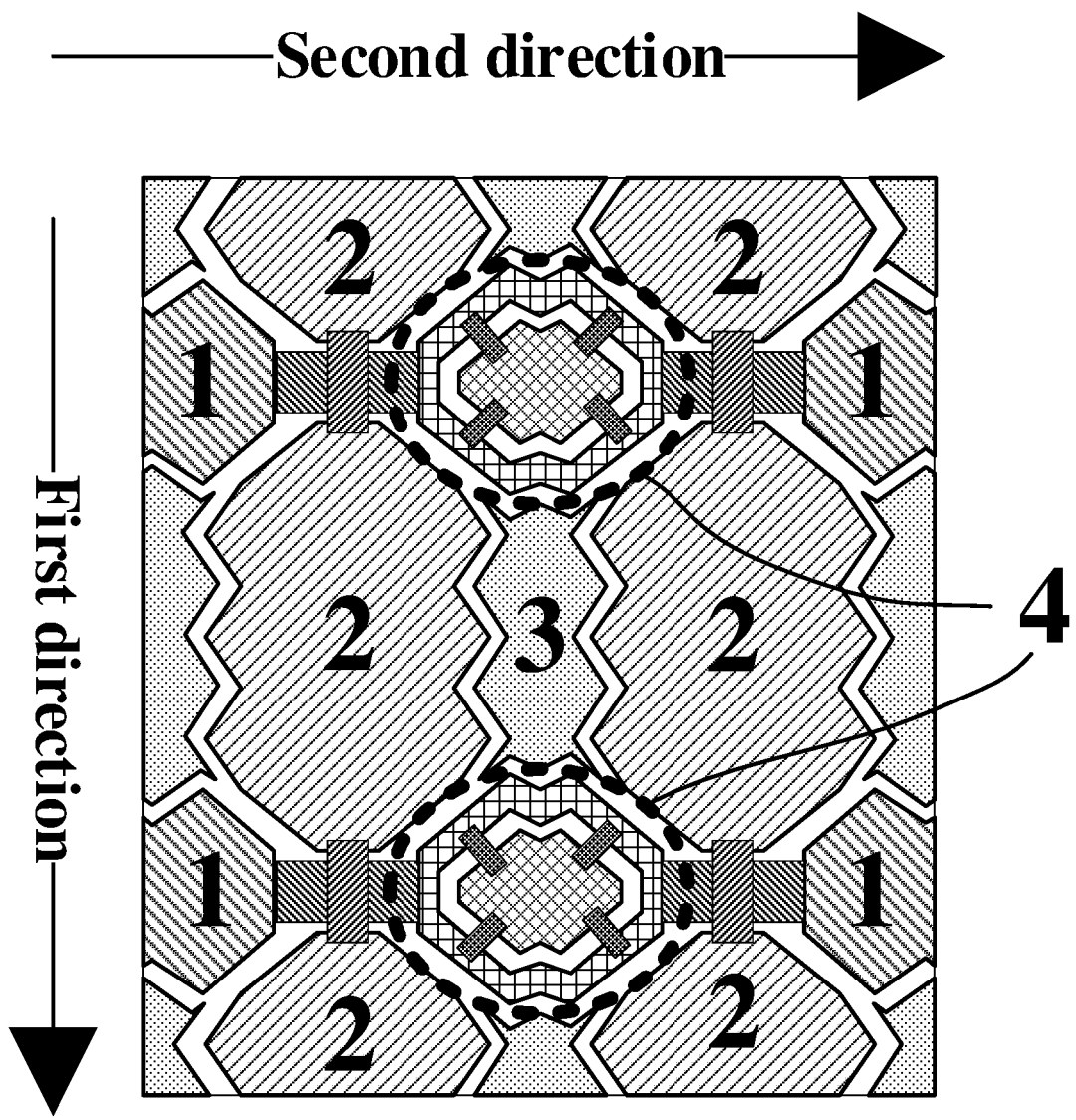
FIG. 6 is a schematic diagram illustrating a partial structure of a touch substrate in some embodiments according to the present disclosure.

As discussed above, and referring to FIG. 1 and FIG. 3, the touch substrate further includes a plurality of dummy patterns. FIG. 6 is a schematic diagram illustrating a partial structure of a touch substrate in some embodiments according to the present disclosure. Referring to FIG. 6, in some embodiments, two adjacent first connecting structures of the plurality of first connecting structures 4 along the first direction are spaced apart by one of the plurality of dummy patterns 3, which also spaces apart two adjacent second touch electrode blocks respectively fam two adjacent second touch electrodes of the plurality of second touch electrodes 20.

In some embodiments, the plurality of first touch electrodes 10, the plurality of second touch electrodes 20, the plurality of first connecting structures 4, are made of a first material, e.g., a same metal oxide material (e.g., indium tin oxide) or a same metallic material (e.g., nano-silver). In some embodiments, the first bridge b1, the second bridge b2, the third bridge b3, the fourth bridge b4, and the one or more first island bridges bi are made of a second material, e.g., a same metallic material or a same metal oxide material. Optionally, the first material and the second material are the same material. Optionally, the first material and the second material are different from each other. Optionally, the first material includes a metal oxide material and the second material includes a metallic material.

Optionally, the plurality of first touch electrodes 10, the plurality of second touch electrodes 20, the plurality of first connecting structures 4, the first bridge b1, the second bridge b2, the third bridge b3, and the fourth bridge b4 are made of a same metal oxide material, e.g., indium tin oxide.

Figure 7:
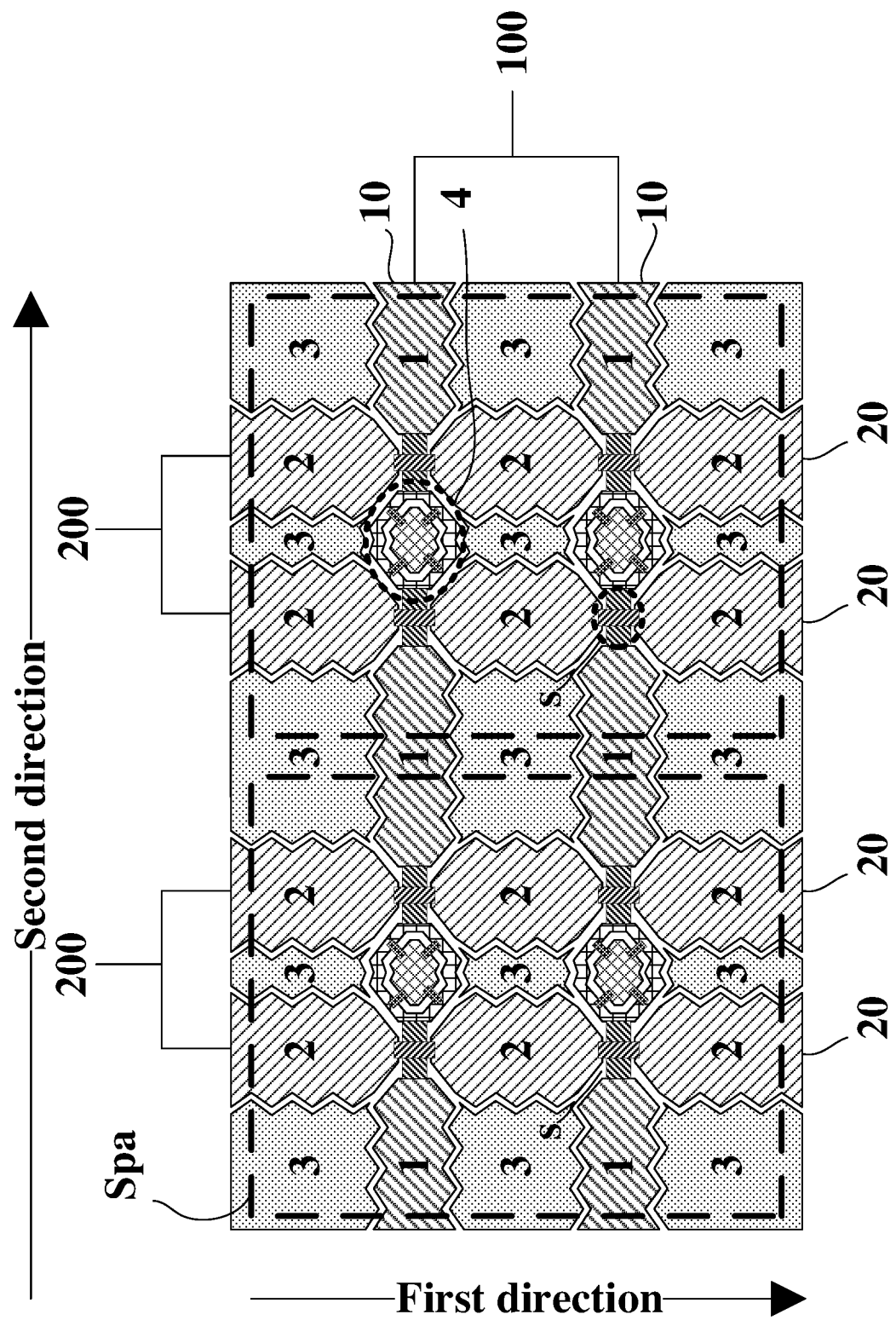
FIG. 7 is a schematic diagram illustrating the structure of a touch substrate in some embodiments according to the present disclosure.

FIG. 7 is a schematic diagram illustrating the structure of a touch substrate in some embodiments according to the present disclosure. Referring to FIG. 7, in some embodiments, multiple ones of the plurality of first touch electrode blocks 1 of a respective one of the plurality of first touch electrodes 10 and multiple ones of the plurality of first connecting structures 4 are alternately arranged along the second direction, thereby forming a conductive channel of the respective one of the plurality of the first touch electrodes 10.

Figure 8:
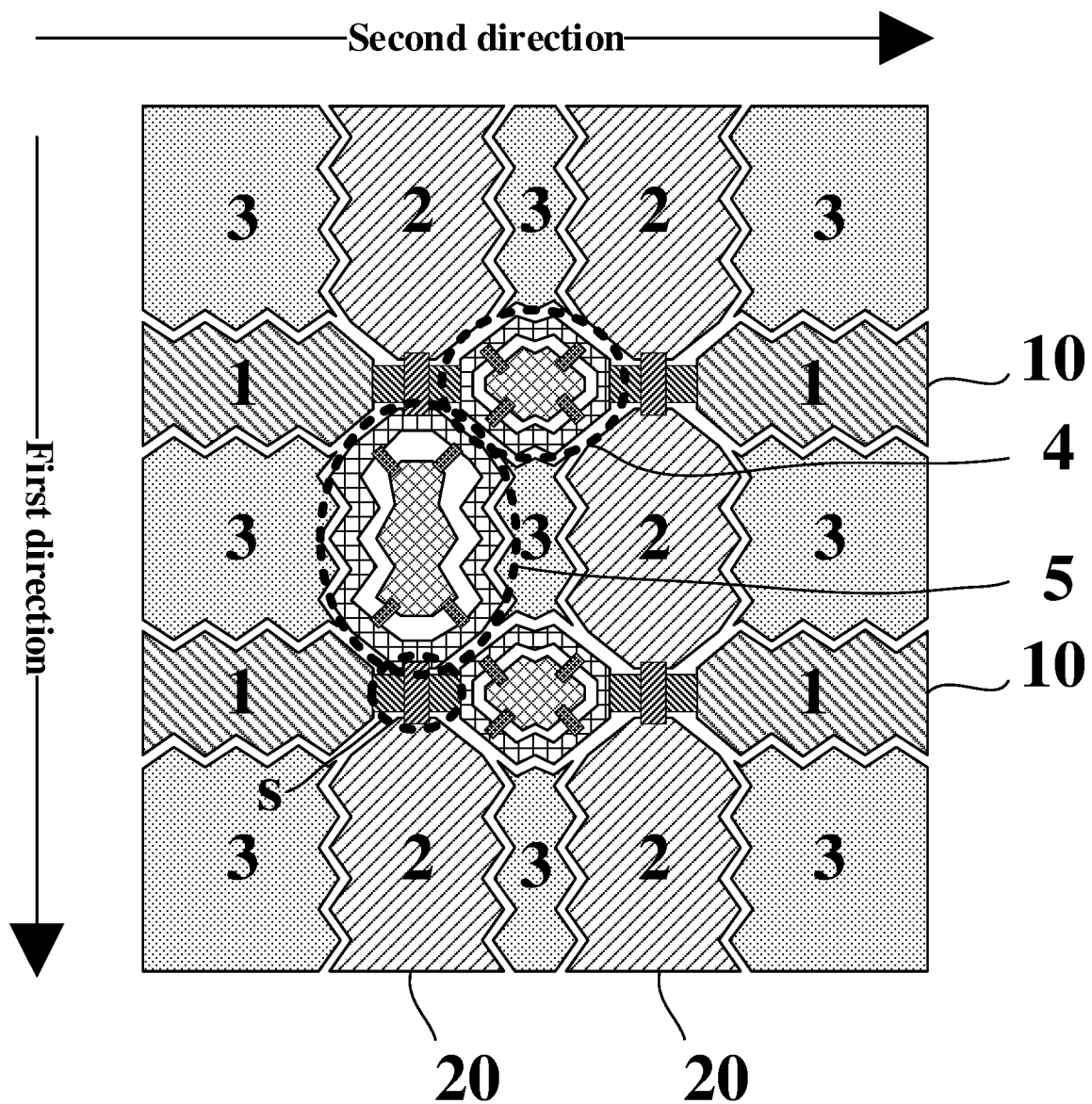
FIG. 8 is a schematic diagram illustrating the structure of a touch substrate in some embodiments according to the present disclosure.

FIG. 8 is a schematic diagram illustrating the structure of a touch substrate in some embodiments according to the present disclosure. Referring to FIG. 8, the touch substrate in some embodiments further includes a plurality of second connecting structures 5. Each individual one of the plurality of second connecting structures 5 is between two adjacent second touch electrode blocks of a respective one of the plurality of second touch electrodes 20, the two adjacent second touch electrode blocks of the respective one of the plurality of second touch electrodes 20 arranged along the first direction. The two adjacent second touch electrode blocks along the second direction of the respective one of the plurality of second touch electrodes 20 are spaced apart from each other, and are electrically connected to each other through one of the plurality of second connecting structures 5.

Figure 9:
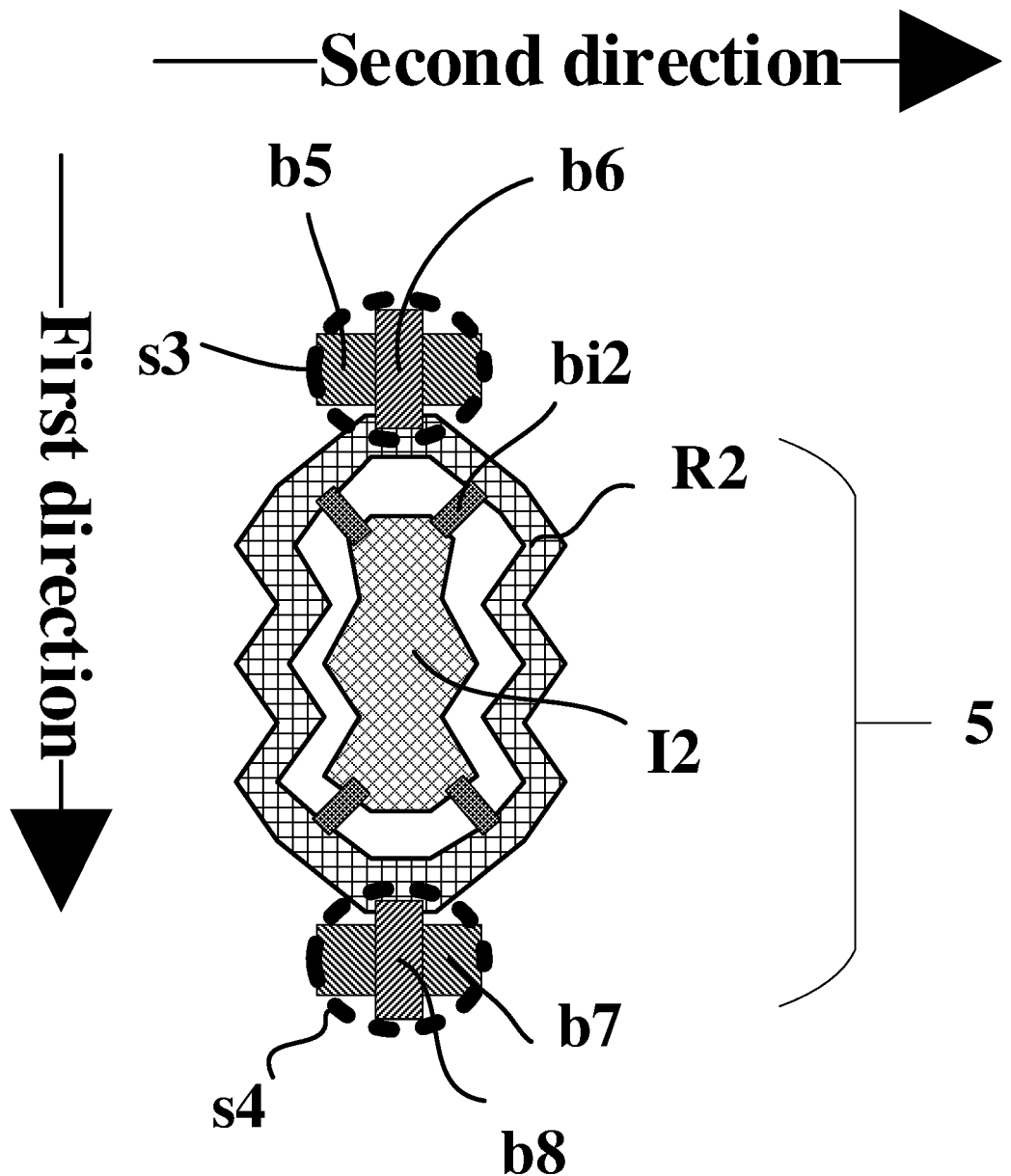
FIG. 9 is a schematic diagram illustrating the structure of a second connecting structure in some embodiments according to the present disclosure.

FIG. 9 is a schematic diagram illustrating the structure of a second connecting structure in some embodiments according to the present disclosure. Referring to FIG. 8 and FIG. 9, each of the plurality of second connecting structures 5 includes a second conductive connecting ring R2. The two adjacent second touch electrode blocks along the first direction of the respective one of the plurality of second touch electrodes 20 are electrically connected to each other through one of the second conductive connecting ring R2. Each of the plurality of second connecting structures 5 is between the third intersection s3 and the fourth intersection s4 of the plurality of intersections along the first direction.

Referring to FIG. 8 and FIG. 9, the touch substrate further includes a fifth bridge b5 and a sixth bridge b6 insulated from each other and at the third intersection s3 of the plurality of intersections s, and a seventh bridge b7 and a eighth bridge 8 insulated from each other and at the fourth intersection s4 of the plurality of intersections s. The fifth bridge b5 connects two adjacent first touch electrode blocks of a first one of the plurality of first touch electrodes 10 at the third intersection s3 and along the second direction. The seventh bridge b7 connect two adjacent first touch electrode blocks of a second one of the plurality of first touch electrodes 10 at the fourth intersection s4 and along the second direction. Each of the plurality of second connecting structures 5 is connected to two adjacent second touch electrode blocks of a respective one of the plurality of second touch electrodes 20 along the first direction, respectively trough the sixth bridge b6 at the third intersection s3 and the eighth bridge b8 at the fourth intersection 4. Referring to FIG. 9, the second conductive connecting ring R2 of a respective one of the plurality of second connecting structure 5 is connected to a first adjacent second touch electrode block to the upper side through the sixth bridge b6 at the third intersection s3, and is connected to a second adjacent second touch electrode block to the lower side trough the eighth bridge b8 at the fourth intersection s4.

Referring to FIG. 8 and FIG. 9, in some embodiments, at least one of the plurality of second connecting structures 5 further includes a second conductive connecting island I2 surrounded by the second conductive connecting ring R2. The second conductive connecting island I2 is spaced apart from the second conductive connecting ring R2 by an insulating layer. Optionally, the at least one of the plurality of second connecting structures 5 further includes one or more second island bridges bi2 connecting the second conductive connecting island I2 to the second conductive connecting ring R2 Optionally, the at least one of the plurality of second connecting structures 5 further includes more than one of the one or more second island bridges bi2. For example, FIG. 9 shows one of the plurality of second connecting structures 5 having four of the one or more second island bridges bi2 connecting the second conductive connecting island I2 to the second conductive connecting ring R2. Optionally, each of the plurality of second connecting structures 5 includes multiple ones of the one or more second island bridges bi2 connecting the second conductive connecting island I2 to the second conductive connecting ring R2. Optionally, each of the one or more second island bridges bi2 extends along a direction that is non-parallel to the first direction and non-parallel to the second direction.

Referring to FIG. 7, the touch substrate in some embodiments further includes a plurality of first touch signal lines 100 and a plurality of second touch signal lines 200. In some embodiments, each of the plurality of first touch signal lines 100 is electrically connected to two or mare (e.g. 0.2, 3, 4, or more) of the plurality of first touch electrodes 10, which are electrically connected in parallel. In some embodiments, each of the plurality of second touch signal lines 200 is electrically connected to two or more (e.g. 2, 3, 4, or more) of the plurality of second touch electrodes 20, which are electrically connected in parallel.

In another aspect, the present disclosure provides a touch control display panel having a touch substrate described herein or fabricated by a method described herein. Optionally, the touch control display panel is a flexible touch control display panel.

In another aspect, the present disclosure provides a touch control display apparatus having a touch substrate described herein or fabricated by a method described herein. Examples of appropriate display apparatuses include, but are not limited to, an electronic paper, a mobile phone, a tablet computer, a television, a monitor, a notebook computer, a digital album, a GPS, etc. Optionally, the touch control display apparatus is a flexible touch control display apparatus. Optionally, the touch control display apparatus has a plurality of subpixels, each of the plurality of subpixel includes multiple ones of the plurality of first connecting structures. Optionally, each of the plurality of subpixels includes multiple ones of the plurality of second connecting structures. Referring to FIG. 7, the touch substrate includes a plurality of subpixel areas Spa corresponding to the plurality of subpixels in the touch control display apparatus. Each of the plurality of subpixel areas Spa in the touch substrate of FIG. 7 include four of the plurality of first connecting structures 4.

In another aspect, the present disclosure provides a method of fabricating a touch substrate. FIG. 10 is a flow chart illustrating a method of fabricating a touch substrate in some embodiments according to the present disclosure. Refining to FIG. 10, the method in some embodiments includes forming a first touch electrode layer and faming a second touch electrode layer. The step of forming the first touch electrode layer includes forming a plurality of first touch electrodes successively along a first direction, each of the plurality of first touch electrodes formed to extend substantially along a second direction. The step of forming a second touch electrode layer includes forming a plurality of second touch electrodes successively along the second direction, each of the plurality of second touch electrodes formed to extend substantially along the first direction. The step of forming each of the plurality of first touch electrodes includes forming a plurality of first touch electrode blocks electrically connected substantially along the second direction. The step of forming each of the plurality of second touch electrodes includes faming a plurality of second touch electrode blocks electrically connected substantially along the first direction.

In some embodiments, the method further including forming a plurality of first connecting structures, each individual one of which being formed between two adjacent first touch electrode blocks of a respective one of the plurality of first ouch electrodes. Optionally, the two adjacent first touch electrode blocks along the second direction of the respective one of the plurality of first touch electrodes are formed to be electrically connected to each other through one of the plurality of first connecting structures. Optionally, the step of forming each of the plurality of first connecting structures includes forming a first conductive connecting ring. Optionally, the step of forming at least one of the plurality of first connecting structures further includes forming a first connective connecting island surrounded by the first conductive connecting ring. Optionally, the step of forming at least one of the plurality of first connecting structures further includes forming one or more first island bridges connecting the first conductive connecting island to the first conductive connecting ring. Optionally, each of the one or more first island bridges extends along a direction that is non-parallel to the first direction and non-parallel to the second direction.

In some embodiments, the plurality of first touch electrodes and the plurality of second touch electrodes are formed to crow over each other thereby forming a plurality of intersections. Each of the plurality of first connecting structures is formed between a first intersection and a second intersection of the plurality of intersections. The first intersection and the second intersection are along the second direction and adjacent to each other.

In some embodiments, the method further includes forming a first bridge and forming a second bridge, the first bridge and the second bridge formed to be insulated from each other and at the first intersection of the plurality of intersections; and forming a third bridge and forming a fourth bridge, the third bridge and the fourth bridge formed to be insulated from each other and at the second intersection of the plurality of intersections. Optionally the second bridge is formed to connect two adjacent second touch electrode blocks of a first one of the plurality of second touch electrodes at the first intersection and along the first direction. Optionally, the forth bridge iso formed to connect two adjacent second touch electrode blocks of a second one of the plurality of second touch electrodes at the second intersection and along the first direction. Optionally, each of the plurality of first connecting structures is funned to be connected to two adjacent first touch electrode blocks of a respective one of the plurality of first touch electrodes along the second direction, respectively through the first bridge at the first intersection and the third bridge at the second intersection.

Optionally, the method includes forming a conductive material layer, and patterning the conductive material layer in a single patterning step, using a same mask plate, to form the two adjacent fat touch electrode blocks of the respective one of the plurality of first touch electrodes, the fast bridge at the first intersection, and the third bridge at the second intersection in a same layer and as an integral structure.

Optionally, the method includes forming a conductive material layer, and patterning the conductive material layer in a single patterning step, using a same mask plate, to form the plurality of first touch electrodes, the plurality of second touch electrodes, the plurality of first connecting structures, the first bridge, and the third bridge in a same layer.

Optionally, the method further includes forming an insulating layer, the insulating layer formed to insulate the first bridge from the second bridge and insulate the third bridge from the fourth bridge. Optionally, the second bridge and the fourth bridge are formed on a side of the insulating layer distal to the same layer including the plurality of first touch electrodes, the plurality of second touch electrodes, the plurality of first connecting structures, the first bridge, and the third bridge. Optionally, the one or more first island bridges are formed on a side of the insulating layer distal to the first conductive connecting ring and the first conductive connecting island, and the insulating layer is formed to space apart the first conductive connecting ring fam the first conductive connecting island.

In some embodiments, the method further includes forming a plurality of dummy patterns. Optionally, two adjacent first connecting structures of the plurality of first connecting structures along the first direction are formed to be spaced apart by one of the plurality of dummy pattern, which also spaces apart two adjacent second touch electrode blocks respectively from two adjacent second touch electrodes of the plurality of second touch electrodes.

Optionally, the plurality of first touch electrodes, the plurality of second touch electrodes, the plurality of first connecting structures, the first bridge, the second bridge, the third bridge, and the fourth bridge are formed using a same metal oxide material, e.g., indium tin oxide.

Optionally, the plurality of first touch electrodes and the plurality of first connecting structures are formed so that multiple ones of the plurality of first touch electrode blocks of a respective one of the plurality of first touch electrodes and multiple ones of the plurality of first connecting structures are alternately arranged along the second direction, thereby forming a conductive channel of the respective one of the plurality of the first touch electrodes.

In some embodiments, the method further includes forming a plurality of second connecting structures, each individual one of which being formed between two adjacent second touch electrode blocks of a respective one of the plurality of second touch electrodes. Optionally, the two adjacent second ouch electrode blocks along the second direction of the respective one of the plurality of second touch electrodes are formed to be electrically connected to each other through one of the plurality of second connecting structures. Optionally, each of the plurality of second connecting structures is formed to include a second conductive connecting ring. Optionally, the step of forming at least one of the plurality of second connecting structures further includes forming a second conductive connecting island surrounded by the second conductive connecting ring. Optionally, the step of forming the at least one of the plurality of second connecting structures further includes forming one or more second island bridges connecting the second conductive connecting island to the second conductive connecting ring.

In some embodiments, the method further includes faming a plurality of first touch signal lines and a plurality of second touch signal lies. Optionally, each of the plurality of first touch signal lines is electrically connected to two or more of the plurality of first touch electrodes, which are electrically connected in parallel. Optionally, each of the plurality of second touch signal lines is electrically connected to two or more of the plurality of second touch electrodes, which are electrically connected in parallel.

Various appropriate conductive materials and various appropriate fabricating methods may be used to make the first touch electrode layer, the second touch electrode layer, the first conductive connecting island, the first conductive connecting ring, the second conductive connecting island, and the second conductive connecting ring. For example, a conductive electrode material may be deposited on the substrate, e.g., by sputtering or vapor deposition or solution coating; and patterned. Examples of conductive electrode materials for making the first touch electrode layer, the second touch electrode layer, the first conductive connecting island the first conductive connecting ring, the second conductive connecting island, and the second conductive connecting ring include, but are not limited to, various transparent oxide electrode materials, transparent nano-carbon tubes, a metal mesh, a nano-silver mesh, a carbon nano tube, a nano mesh, graphene, and conductive polymers such as poly(3,4-polystyrene sulfonate (PEDOT:PSS). Examples of transparent metal oxide materials include, but are not limited to, indium tin oxide, imin zinc oxide, indium gallium oxide, and indium gallium zinc oxide.

Various appropriate conductive materials and various appropriate fabricating methods may be used to make the first bridge, the second bridge, the third bridge, the fourth bridge, the fifth bridge, the sixth bridge, the seventh bridge, the eighth bridge, the one or more first island bridges, and the one or more second island bridges. For example, a conductive electrode material may be deposited on the substrate, e.g., by sputtering or vapor deposition or solution coating; and patterned. Examples of conductive electrode materials for making the first bridge, the second bridge, the third bridge, the fourth bridge, the fifth bridge, the sixth bridge, the seventh bridge, the eighth bridge, the one or more first island bridges, and the one or more second island bridges include, but are not limited to, various metallic materials, various graphene electrode materials, various transparent metal oxide electrode materials, and various transparent nano-carbon tubes. Examples of appropriate metal electrode materials include, but are not limited to, copper, aluminum, silver, molybdenum chromium neodymium, nickel, manganese, titanium, tantalum, and tungsten. Examples of transparent metal oxide materials include, but are not limited to, indium tin oxide, indium zinc oxide, indium gallium oxide, and indium gallium zinc oxide.

Various appropriate insulating materials and various appropriate fabricating methods may be used to make the insulating layer and the overcoat layer. For example, an insulating material may be deposited on the substrate by a plasma-enhanced chemical vapor deposition (PECVD) process. Examples of appropriate insulating materials include, but are not limited to, polyimide, silicon oxide (SiOy), silicon nitride (SiNy, e.g., Si3N4), and silicon oxynitride (SiOxNy).

Various appropriate insulating materials and various appropriate fabricating methods my be used to make the base substrate. Examples of appropriate materials for making the base substrate include, but are limited to, cyclo-olefin polymer, polycarbonate, acrylic materials, and silicon dioxide.

The foregoing description of the embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the disclosure and its best mode practical application, thereby to enable persons skilled in the art to understand the disclosure for various embodiments and with various modifications as arm suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the lie does not necessarily limit the claim scope to a specific embodiment, and the reference to exemplary embodiments f the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claim.

What is claimed is:

1. A touch substrate, comprising:
   a first touch electrode layer comprising a plurality of first touch electrodes successively along a first direction, each of the plurality of first touch electrodes extending substantially along a second direction; and
   a second touch electrode layer comprising a plurality of second touch electrodes successively along the second direction, each of the plurality of second touch electrodes extending substantially along the first direction;
   wherein each of the plurality of first touch electrodes comprises a plurality of first touch electrode blocks electrically connected substantially along the second direction; and
   each of the plurality of second touch electrodes comprises a plurality of second touch electrode blocks electrically connected substantially along the first direction;
   wherein the touch substrate further comprising a plurality of first connecting structures, each individual one of which being between two adjacent first touch electrode blocks of a respective one of the plurality of first touch electrodes;
   the two adjacent first touch electrode blocks along the second direction of the respective one of the plurality of first touch electrodes are electrically connected to each other through one of the plurality of first connecting structures; and
   each of the plurality of first connecting structures comprises a first conductive connecting ring;
   wherein at least one of the plurality of first connecting structures further comprises:
   a first conductive connecting island surrounded by the first conductive connecting ring; and
   one or more first island bridges connecting the first conductive connecting island to the first conductive connecting ring.

2. The touch substrate of claim 1, wherein each of the one or more first island bridges extends along a direction that is non-parallel to the first direction and non-parallel to the second direction.

3. The touch substrate of claim 1, wherein the plurality of first touch electrodes and the plurality of second touch electrodes cross over each other thereby forming a plurality of intersections;
   each of the plurality of first connecting structures is between a first intersection and a second intersection of the plurality of intersections; and
   the first intersection and the second intersection are along the second direction and adjacent to each other.

4. A touch substrate, comprising:
   a first touch electrode layer comprising a plurality of first touch electrodes successively along a first direction, each of the plurality of first touch electrodes extending substantially along a second direction;
   a second touch electrode layer comprising a plurality of second touch electrodes successively along the second direction, each of the plurality of second touch electrodes extending substantially along the first direction;
   a first bridge and a second bridge insulated from each other and at the first intersection of the plurality of intersections; and a third bridge and a fourth bridge insulated from each other and at the second intersection of the plurality of intersections;

wherein each of the plurality of first touch electrodes comprises a plurality of first touch electrode blocks electrically connected substantially along the second direction; and each of the plurality of second touch electrodes comprises a plurality of second touch electrode blocks electrically connected substantially along the first direction;

wherein the touch substrate further comprising a plurality of first connecting structures, each individual one of which being between two adjacent first touch electrode blocks of a respective one of the plurality of first touch electrodes;

the two adjacent first touch electrode blocks along the second direction of the respective one of the plurality of first touch electrodes are electrically connected to each other through one of the plurality of first connecting structures; and each of the plurality of first connecting structures comprises a first conductive connecting ring;

the plurality of first touch electrodes and the plurality of second touch electrodes cross over each other thereby forming a plurality of intersections;

each of the plurality of first connecting structures is between a first intersection and a second intersection of the plurality of intersections;

the first intersection and the second intersection are along the second direction and adjacent to each other;

the second bridge connects two adjacent second touch electrode blocks of a first one of the plurality of second touch electrodes at the first intersection and along the first direction;

the fourth bridge connects two adjacent second touch electrode blocks of a second one of the plurality of second touch electrodes at the second intersection and along the first direction; and each of the plurality of first connecting structures is connected to two adjacent first touch electrode blocks of a respective one of the plurality of first touch electrodes along the second direction, respectively through the first bridge at the first intersection and the third bridge at the second intersection.

5. The touch substrate of claim 4, wherein the two adjacent first touch electrode blocks of the respective one of the plurality of first touch electrodes, the first bridge at the first intersection, and the third bridge at the second intersection, constitute an integral structure, are in a same layer, and comprise a same material.

6. The touch substrate of claim 5, wherein the plurality of first touch electrodes, the plurality of second touch electrodes, the plurality of first connecting structures, the first bridge, and the third bridge are in a same layer, and comprise a same material;

the touch substrate further comprises an insulating layer insulating the first bridge from the second bridge and insulating the third bridge from the fourth bridge; and the second bridge and the fourth bridge are on a side of the insulating layer distal to the same layer comprising the plurality of first touch electrodes, the plurality of second touch electrodes, the plurality of first connecting structures, the first bridge, and the third bridge.

7. The touch substrate of claim 6, wherein at least one of the plurality of first connecting structures further comprises a first conductive connecting island surrounded by the first conductive connecting ring, and one or more first island bridges connecting the first conductive connecting island to the first conductive connecting ring;

the one or more first island bridges are on a side of the insulating layer distal to the first conductive connecting ring and the first conductive connecting island; and the insulating layer spaces apart the first conductive connecting ring from the first conductive connecting island.

8. The touch substrate of claim 1, further comprising a plurality of dummy patterns;

wherein two adjacent first connecting structures of the plurality of first connecting structures along the first direction are spaced apart by one of the plurality of dummy patterns, which also spaces apart two adjacent second touch electrode blocks respectively from two adjacent second touch electrodes of the plurality of second touch electrodes.

9. The touch substrate of claim 4, wherein the plurality of first touch electrodes, the plurality of second touch electrodes, the plurality of first connecting structures, the first bridge, the second bridge, the third bridge, and the fourth bridge are made of a same metal oxide material.

10. The touch substrate of claim 1, wherein multiple ones of the plurality of first touch electrode blocks of a respective one of the plurality of first touch electrodes and multiple ones of the plurality of first connecting structures are alternately arranged along the second direction, thereby forming a conductive channel of the respective one of the plurality of the first touch electrodes.

11. The touch substrate of claim 1, further comprising a plurality of second connecting structures, each individual one of which being between two adjacent second touch electrode blocks of a respective one of the plurality of second touch electrodes;

wherein the two adjacent second touch electrode blocks along the second direction of the respective one of the plurality of second touch electrodes are electrically connected to each other through one of the plurality of second connecting structures; and each of the plurality of second connecting structures comprises a second conductive connecting ring.

12. The touch substrate of claim 11, wherein at least one of the plurality of second connecting structures further comprises a second conductive connecting island surrounded by the second conductive connecting ring.

13. The touch substrate of claim 12, wherein the at least one of the plurality of second connecting structures further comprises one or more second island bridges connecting the second conductive connecting island to the second conductive connecting ring.

14. The touch substrate of claim 1, further comprising a plurality of first touch signal lines and a plurality of second touch signal lines;

wherein each of the plurality of first touch signal lines is electrically connected to two or more of the plurality of first touch electrodes, which are electrically connected in parallel; and each of the plurality of second touch signal lines is electrically connected to two or more of the plurality of second touch electrodes, which are electrically connected in parallel.

15. A touch control display apparatus, comprising the touch substrate of claim 1.

16. The touch control display apparatus of claim 15, wherein the touch control display apparatus is a flexible touch control display apparatus.

17. The touch control display apparatus of claim 15, wherein the touch control display apparatus has a plurality of subpixels; and
 each of the plurality of subpixels comprises four of the plurality of first connecting structures.

18. A method of fabricating a touch substrate, comprising:
 forming a first touch electrode layer comprising a plurality of first touch electrodes successively along a first direction, each of the plurality of first touch electrodes extending substantially along a second direction; and
 forming a second touch electrode layer comprising a plurality of second touch electrodes successively along the second direction, each of the plurality of second touch electrodes extending substantially along the first direction;
 wherein forming each of the plurality of first touch electrodes comprises forming a plurality of first touch electrode blocks electrically connected substantially along the second direction; and
 forming each of the plurality of second touch electrodes comprises forming a plurality of second touch electrode blocks electrically connected substantially along the first direction;
 wherein the method further comprising forming a plurality of first connecting structures, each individual one of which being formed between two adjacent first touch electrode blocks of a respective one of the plurality of first touch electrodes;
the two adjacent first touch electrode blocks along the second direction of the respective one of the plurality of first touch electrodes are formed to be electrically connected to each other through one of the plurality of first connecting structures; and forming each of the plurality of first connecting structures comprises forming a first conductive connecting ring;

wherein forming at least one of the plurality of first connecting structures further comprises:

forming a first conductive connecting island surrounded by the first conductive connecting ring; and forming one or more first island bridges connecting the first conductive connecting island to the first conductive connecting ring.

\* \* \* \* \*